Feb. 10, 1959 E. L. DAHLUND 2,873,002
VARIABLE DELIVERY LUBRICANT SUPPLY MEANS FOR ENGINES
Filed Feb. 14, 1956
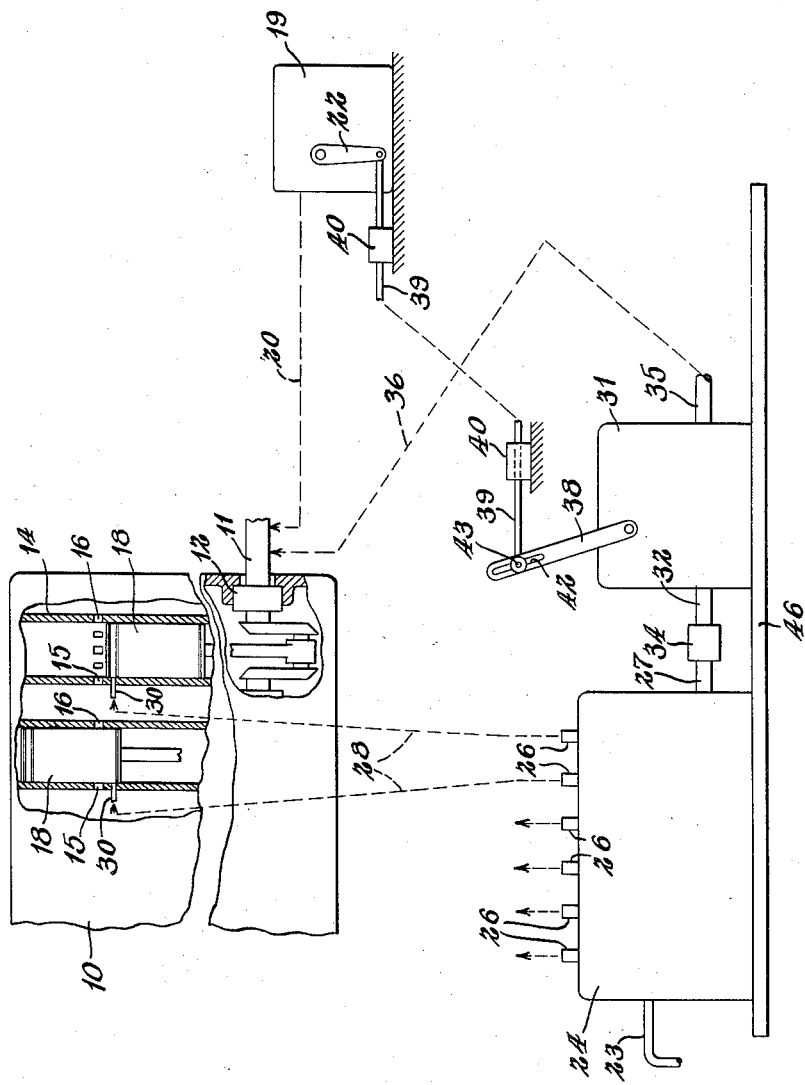
Inventor
Ervin L. Dahlund

United States Patent Office

2,873,002
Patented Feb. 10, 1959

2,873,002

VARIABLE DELIVERY LUBRICANT SUPPLY MEANS FOR ENGINES

Ervin L. Dahlund, Beloit, Wis., assignor to Fairbanks, Morse & Co., Chicago, Ill., a corporation of Illinois Application February 14, 1956, Serial No. 565,449

3 Claims. (Cl. 184—6)

This invention relates to improvements in lubricating systems for operating mechanisms such as internal combustion engines, which are subject to relatively wide variations in loading. The invention concerns in particular, a lubrication system wherein the quantity or rate of lubricant delivery to the mechanism or engine zones to be lubricated, as the cylinder walls, is regulated in direct accord with engine loading, such as to effect minimum although adequate lubrication at engine idling and under relatively light engine loading, and increased rates of lubricant delivery with increases in engine loading.

The principal object of the invention is to provide an engine governor controlled lubricating system effective as hereinabove indicated, which affords pressure delivery of lubricant in quantity or rate of feed in direct accordance with the lubricant requirements of the engine when operating under any given load.

Another object is to provide a lubricating system of the character indicated, which affords desirable economy of lubricant consumption through its operation to supply lubricant to particular engine zones as the cylinder walls, in quantity regulated in accordance with lubricant requirements of the engine.

These and other objects and advantages will appear from the following description of a presently preferred form of the invention, as exemplified in the accompanying drawing wherein the single figure shows in diagrammatic illustration, the preferred form.

Referring to the drawing, 10 indicates an internal combustion engine including a crankshaft 11 having main bearings, one being indicated at 12, which are pressure lubricated in well known manner not here shown. The engine diagrammatically illustrated, is of multi-cylinder type providing cylinders 14 (two being shown) each having air supply ports 15 and exhaust ports 16, and pistons 18 operating in the cylinders. In driven connection to the engine is a governor 19, the drive thereof being indicated by the broken line 20 to the crankshaft 11. Governor 19 may be of any suitable type and construction, such that its response to engine operation is to actuate an output lever or control element 22 from an initial, governor-inactive position (engine shut-down) to a first position corresponding to engine no-load, idling speed operation, and to positions therebeyond determined in direct accordance with engine loading at a given operating speed for the then applied load. Governors operating as above indicated, are well-known in the art and, hence, need not be here further described.

Lubricating fluid, such as oil, is supplied from a suitable source as the engine crankcase oil sump (not shown), through supply line 23 to a pump unit 24 embodying a plurality or gang of pumps (not shown) each having a pressure output indicated at 26. The pumps in the unit are operated by suitable means (not shown) common to the pumps, which means is actuated through driven shaft 27 of the unit. Gang pump unit 24 is of a type well-known in the art, wherein the quantity or rate of lubricant delivery through the pump outlets 26 is variable in direct proportion to the speed of driven shaft 27. The outlets 26 of the pumps lead to the cylinders, as indicated by the dotted delivery lines 28, and the delivery line to each cylinder opens to the cylinder wall through one or more inlets 30. Each inlet 30 is below the air and exhaust port band, as is usual in cylinder wall lubrication.

The gang pump unit 24 is operated through a variable speed transmission 31 having its output shaft 32 connected in driving relation to the pump shaft 27, as by coupling 34. The input shaft 35 of the transmission is driven preferably from the engine crankshaft 11, as indicated by the broken line drive 36.

Transmission 31 may be of any suitable type well-known in the art. It is selected in accordance with the operating speed range of the engine to have the speed of its output shaft 32 variable from zero speed to and between predetermined desired minimum and maximum pump operating speed limits. The minimum speed limit determines operation of the pump unit 24 to effect pressure delivery of lubricant in minimum quantity or rate of feed sufficient for engine cylinder lubrication under, say, no-load idling operation of the engine, while the maximum speed limit determines pump unit output in quantity or rate of feed necessary for adequate and safe lubrication at the engine cylinders under maximum engine loading. Output speeds of the transmission intermediate said limits will, of course, result in corresponding intermediate quantity or rates of lubricant delivery by the pump unit.

The transmission provides an output speed control member 38 which in the view of the drawing figure, is shown at its zero output speed position. Connecting the member 38 and the governor control element 22 is an operating member or link 39 of laterally flexible character, suitably supported and guided by stationary guide sleeves or members 40. The connection is made such that in the initial, governor-inactive position of governor element 22, the transmission control member 38 will be in its zero speed position, as shown in the drawing. For that purpose and to effect proper operative relation of member 38 to the full travel of governor element 22 between its inactive and maximum engine load positions, the connection of link 39 to member 38 is made adjustable, as for example through a longitudinal slot 42 in member 38 and a releasable clamp device 43 projecting through the slot, by which the end of link 39 is adjustably connected to the member. Thus, the effective lever-arm length of member 38 may be determined so that in governor response to locate its control element at the engine no-load idling position, the resultant displacement of member 38 will be to its position adjusting the transmission for an output speed of its output shaft 32 effective to establish the heretofore indicated minimum quantity delivery by the pump unit 24. The lever-arm adjustment then will determine increased speed drive of the pump unit in direct proportion with displacements of the governor element 22 in response to increases in engine loading, such that at the maximum engine load position of governor element 22, the transmission control member 38 will be in a position determining the aforementioned selected maximum speed drive of the pump unit 24, for determining maximum quantity or rate of lubricant feed to the cylinders as required under maximum engine loading.

It is to be noted that the pump unit 24 and transmission 31 may be compactly arranged and mounted on a single or common support 46 adapted for mounting on an engine frame part (not shown) in selected position thereon relative to the governor 19.

Having now described and illustrated a presently preferred embodiment of the invention, what it is desired to claim and secure by Letters Patent is:

1. In a cylinder wall lubrication system for an internal combustion engine having a cylinder provided with lubricant admission port means, lubricant supply means connected to said port means, said supply means including a variable speed pump operable to supply lubricant under pressure and in quantity proportional to pump speed, pump drive means including a transmission device having a variable speed drive element in driving connection to the pump, the transmission device having a control member for determining the speed of said drive element, an engine driven governor settable at fixed speeds, a control element positionable by the governor in response to changes in engine loading at said fixed speeds, and means connecting said control element to said control member for actuation thereof, whereby to determine said variable pump speed in accordance with control element position.

2. In a cylinder wall lubrication system for an internal combustion engine having a cylinder provided with lubricant admission port means, lubricant supply means connected to said port means, said supply means including a variable speed pump operable to supply lubricant under pressure and in quantity proportional to pump speed, an engine driven transmission device having a variable speed drive element in driving connection to the pump, the transmission device having a control member for determining the speed of said drive element, an engine driven governor settable at fixed speeds, having a control element positionable by the governor in response to changes in engine loading at said fixed speeds, and means connecting said control element to said control member for actuation thereof, whereby to determine said variable pump speed in accordance with control element position.

3. In a cylinder wall lubrication system for an internal combustion engine having a cylinder provided with lubricant admission port means, lubricant supply means connected to said port means, said supply means including a variable speed pump operable to supply lubricant under pressure and in quantity proportional to pump speed, a transmission device having a variable speed drive element in driving connection to the pump and a control member for determining the speed of said drive element, constant speed motor means for operating said transmission device, an engine driven governor settable at fixed speeds, a control element positionable by the governor in response to changes in engine loading at said fixed speeds, and means connecting said control element to said control member for actuation thereof, whereby to determine said variable pump speed in accordance with control element position.

References Cited in the file of this patent

UNITED STATES PATENTS

| | | |
|---|---|---|
| 1,054,808 | Waldon | Mar. 4, 1913 |
| 1,336,542 | Sollima | Apr. 13, 1920 |
| 1,993,359 | Church | Mar. 5, 1935 |
| 2,128,986 | Chilton | Sept. 6, 1938 |